United States Patent
Zlotnik et al.

(10) Patent No.: US 12,189,596 B2
(45) Date of Patent: Jan. 7, 2025

(54) DATABASE MANAGEMENT

(71) Applicant: Micron Technology, Inc., Boise, ID (US)

(72) Inventors: Leon Zlotnik, Camino, CA (US); Brian Toronyi, Boulder, CO (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/532,552

(22) Filed: Dec. 7, 2023

(65) Prior Publication Data

US 2024/0193144 A1    Jun. 13, 2024

Related U.S. Application Data

(60) Provisional application No. 63/431,947, filed on Dec. 12, 2022.

(51) Int. Cl.
G06F 16/00    (2019.01)
G06F 16/22    (2019.01)

(52) U.S. Cl.
CPC ................ G06F 16/2255 (2019.01)

(58) Field of Classification Search
CPC ............. G06F 16/2255; G06F 16/1425; G06F 2009/45583
See application file for complete search history.

(56) References Cited

U.S. PATENT DOCUMENTS 7,613,701 B2    11/2009  Zhao et al.
2021/0109917 A1   4/2021  Xiao et al.
2021/0202003 A1*  7/2021  Varisco ............... G11C 16/20
2023/0068102 A1*  3/2023  Bavishi ............. G06F 12/1408
2024/0069728 A1*  2/2024  Toronyi ............. G06F 3/0629

FOREIGN PATENT DOCUMENTS

WO           95011487        4/1995
WO    WO-2021/006979 A1 *  1/2021    ......... G06F 15/7825

OTHER PUBLICATIONS

Mohammad Norouzi, Ali Punjani, and David J. Fleet, "Fast Exact Search in Hamming Space with Multi-Index Hashing," IEEE Transactions On Pattern Analysis And Machine Intelligence, vol. 36, No. 6, Jun. 2014, pp. 1107-1119. (Year: 2014).*

* cited by examiner

*Primary Examiner* — Cheryl Lewis (74) *Attorney, Agent, or Firm* — Brooks, Cameron & Huebsch, PLLC (57) ABSTRACT

A hash corresponding to a bit string is generated. The hash corresponds to an address location in a data structure associated with the bit string. An index and a modifier correspond to the address location in the data structure corresponding to the hash associated with a first address location in the data structure are determined. In response to determining that the modifier has a first value associated therewith, index information corresponding to the bit string is written to the first address location in the data structure. In response to determining that the modifier has a second value other than the first value associated therewith, the index information corresponding to the bit string is written to a second address location in the data structure.

20 Claims, 5 Drawing Sheets

HASH INDEX MEMORY — 331

| | INDEX (334) | MODIFIER (336) |
|---|---|---|
| 335-1 | <UNALLOCATED> | 0 |
| 335-2 | INDEX_A<EXACT ADDR – 1st ATTEMPT> | 1 |
| 335-3 | INDEX_B<EXACT ADDR – 1st ATTEMPT> | 1 |
| 335-4 | <UNALLOCATED> | 0 |
| 335-5 | <UNALLOCATED> | 0 |
| 335-6 | INDEX_C<EXACT ADDR – 1st ATTEMPT> | 1 |
| 335-7 | INDEX_D<EXACT ADDR – 1st ATTEMPT> | 1 |
| 335-8 | INDEX_E<EXACT ADDR+1 – 2nd ATTEMPT> | 2 |
| 335-9 | INDEX_F<EXACT ADDR+2 – 3rd ATTEMPT> | 3 |
| 335-10 | INDEX_G<EXACT ADDR+2 – 3rd ATTEMPT> | 3 |
| 335-11 | INDEX_H<EXACT ADDR+3 – 4th ATTEMPT> | 4 |
| 335-12 | INDEX_I<EXACT ADDR – 1st ATTEMPT> | 1 |
| 335-13 | <UNALLOCATED> | 0 |
| 318-14 | <UNALLOCATED> | 0 |
| 335-15 | INDEX_J<EXACT ADDR+2 – 3rd ATTEMPT> | 3 |
| 335-M | <UNALLOCATED> | 0 |

DATABASE MANAGEMENT

PRIORITY INFORMATION

This application claims the benefit of U.S. Provisional Application No. 63/431,947, filed on Dec. 12, 2022, the contents of which are incorporated herein by reference.

TECHNICAL FIELD

Embodiments of the disclosure relate generally to digital logic circuits, and more specifically, relate to a database management.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Aspects of the present disclosure are directed to database management (e.g., small-scale database management) and, in particular to memory sub-systems that include database management circuitry. The database management circuitry can be provided as a System on Chip (SoC) in some embodiments. Data associated with the database can be stored within one or more memory resources that are associated with the memory sub-system. A memory sub-system can be a storage system, storage device, a memory module, or a combination of such. An example of a memory sub-system is a storage system such as a solid-state drive (SSD). Examples of storage devices and memory modules are described below in conjunction with FIG. 1, et alibi. In general, a host system can utilize a memory sub-system that includes one or more components, such as memory devices that store data. The host system can provide data to be stored at the memory sub-system and can request data to be retrieved from the memory sub-system.

Many contemporary System on Chip (SoC) architectures incorporate databases (e.g., small-scale databases), such as a changelog manager or other databases. In general, such databases should be able to store, search, update, and/or erase highly random elements within a data array (e.g., a data structure). However, due to strict area and power limitations, these databases are typically implemented as hardware and generally are configured to operate with minimal assistance or without assistance from firmware.

Operating under these constraints, some previous approaches include content-addressable memory (CAM), which is a special type of the semi- or full custom memory that returns the address associated with the stored data. However, CAMs are typically very large, power consuming and expensive. In addition, CAMs typically have a limited ability to return multiple matches and do not support highly repetitive data.

Other approaches may employ binary search engines. These engines can use a binary iterative search to find stored data. Though binary searching may be efficient, it generally requires the data to be strictly ordered. However, because data in a computing system can be random in nature, such ordering generally requires extra hardware and consumes very high power, particularly with the large data movements. Further, for a large data array, the power consumed by the search itself can also become quite significant. Fetching data from the memory and comparing it to a search pattern in multiple iterations can result in an amount of power consumed growing proportionally with the data width and logarithmically with the depth. Finally, inserting, updating or removing data elements can trigger re-arrangement of the array, which translates into further power consumption and/or performance degradation.

Still other approaches may employ hash-based search engines. Hash-based search engines generally use a data compression (e.g., a hash) as a search pattern. However, in general, the higher the compression, the more statistical collisions occur. For example, repetitive data directly results in such a collision. To resolve hash collisions, these engines usually extend the memory and store both the false and real duplicates in the extended memory. The extended memory can limit the maximum allowed number of duplicates, which can imply that the engine can process only specific types of data. Alternatively, in some approaches, the extended memory may be made large enough to store all the duplicates, however, searching such a large extended memory rapidly becomes very time consuming and power consuming. Further, every collision generally requires a comparison of original (searched) data vs. the stored data to determine whether the collision involves a real duplicate or a hash artifact. In such approaches, high collision counts can directly translate into increased power consumption in performance of these comparisons. In addition, removing data elements from the extended memory can be a complex procedure that may involve compaction, which can result in increased power consumption and/or performance degradation.

Aspects of the present disclosure address the above and other deficiencies by providing circuitry (e.g., a processing device, database management circuit, or other such hardware device) that manages databases (e.g., small-scale databases) faster and in a manner that consumes less power in comparison with the approaches described above. For example, aspects of the present disclosure do not limit repetitive data like approaches that employ a CAM, do not require data to be ordered like approaches that employ a binary search engine, and do not limit the number of hash duplicates (whether real or not) like approaches that employ a hash-based search engine.

As will be described in more detail herein, aspects of the present disclosure reduce both a time required for performing searches for data in a database and an amount of power consumed in performing such searches. For example, for random data, aspects of the present disclosure perform searches of databases faster than binary searching algorithms while consuming less power than binary searching algorithms and perform searches of databases in comparable times as compared to hash-based search algorithms with a reduced power consumption. Further, for repetitive data, aspects of the present disclosure perform searches of databases in comparable times as compared to binary searching algorithms while consuming less power than binary searching algorithms and perform searches of databases faster than hash-based search algorithms with a reduced power consumption. In addition, aspects of the present disclosure reduce the amount of time consumed in wide data fetch and comparison operations thereby resulting in a reduction in power consumed when compared to such approaches. Moreover, aspects of the present disclosure allow for simplified data insertion and removal without re-arrangement of such data required in some approaches thereby yielding a reduction in power consumption associated with the removal and re-arrangement of data required in some of the approaches described above.

In some embodiments, database management consistent with the disclosure is provided through the use of a sparsely populated data structure that stores data (or hashes corresponding to data) as controlled by the circuitry described herein. In addition, the circuitry can maintain a list or other table that includes index values (e.g., "modifiers" or "modifier values") that correspond to a quantity of times that attempts to write data (or hashes corresponding to the data) have occurred for a given address location in the sparsely populated data structure. By maintaining a sparsely populated data structure in conjunction with the index values described herein, data collisions can be mitigated while allowing for rapid search and retrieval of data of interest while providing a reduction in power consumption as compared with the approaches described above. These and other features of the present disclosure can allow for an improvement in the overall functioning of a memory sub-system and, accordingly, a computing system in which embodiments of the present disclosure operate as compared to previous approaches.

Figure 1:
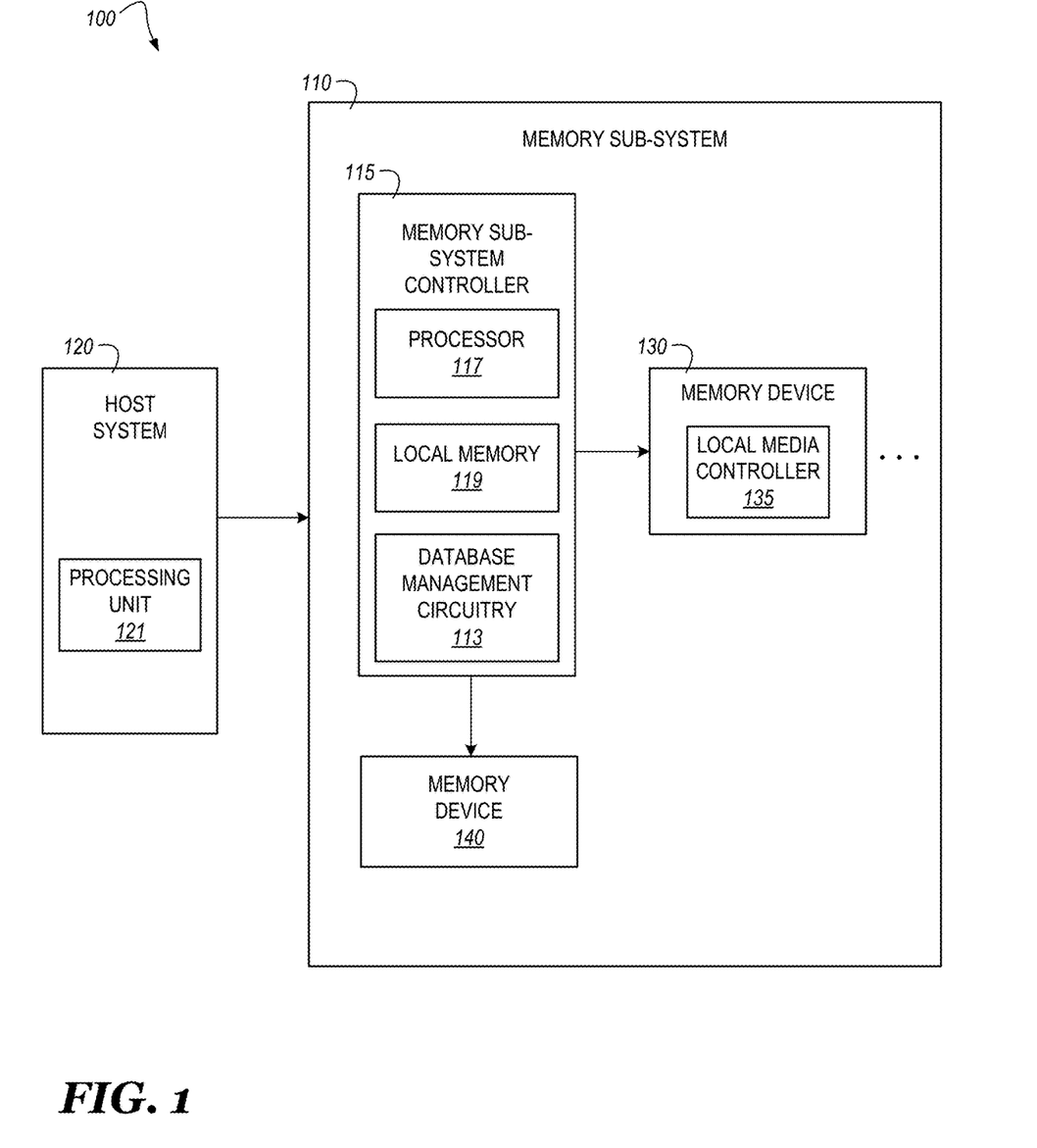
FIG. 1 illustrates an example computing system that includes a memory sub-system in accordance with some embodiments of the present disclosure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IOT) enabled device, embedded computer (e.g., one included in a vehicle, industrial equipment, or a networked commercial device), or such computing device that includes memory and a processing device.

In other embodiments, the voltage sensing circuit 100 can be deployed on, or otherwise included in a computing device such as a desktop computer, laptop computer, server, network server, mobile computing device, a vehicle (e.g., airplane, drone, train, automobile, or other conveyance), Internet of Things (IOT) enabled device, embedded computer (e.g., one included in a vehicle, industrial equipment, or a networked commercial device), or such computing device that includes memory and a processing device. As used herein, the term "mobile computing device" generally refers to a handheld computing device that has a slate or phablet form factor. In general, a slate form factor can include a display screen that is between approximately 3 inches and 5.2 inches (measured diagonally), while a phablet form factor can include a display screen that is between approximately 5.2 inches and 7 inches (measured diagonally). Examples of "mobile computing devices" are not so limited, however, and in some embodiments, a "mobile computing device" can refer to an IoT device, among other types of edge computing devices.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110.

The host system 120 includes a processing unit 121. The processing unit 121 can be a central processing unit (CPU) that is configured to execute an operating system. In some embodiments, the processing unit 121 comprises a complex instruction set computer architecture, such an x86 or other architecture suitable for use as a CPU for a host system 120.

The host system 120 can be coupled to the memory sub-system 110 via a physical host interface or any other type of interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via the same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130, 140 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLC) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130).

In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 can include database management circuitry 113. Although not shown in FIG. 1 so as to not obfuscate the drawings, the database management circuitry 113 can include various circuitry to facilitate aspects of the disclosure described herein. In some embodiments, the database management circuitry 113 can include special purpose circuitry in the form of an ASIC, FPGA, state machine, hardware processing device, and/or other logic circuitry that can allow the database management circuitry 113 to orchestrate and/or perform operations to manage and/or maintain a database, such as a small-scale database in accordance with the disclosure.

In some embodiments, the memory sub-system controller 115 includes at least a portion of the database management circuitry 113. For example, the memory sub-system controller 115 can include a processor 117 (processing device) configured to execute instructions stored in local memory 119 for performing the operations described herein. In some embodiments, the database management circuitry 113 is part of the host system 110, an application, or an operating system. The database management circuitry 113 can be resident on the memory sub-system 110 and/or the memory sub-system controller 115. As used herein, the term "resident on" refers to something that is physically located on a particular component. For example, the database management circuitry 113 being "resident on" the memory sub-system 110, for example, refers to a condition in which the hardware circuitry that comprises the database management circuitry 113 is physically located on the memory sub-system 110. The term "resident on" may be used interchangeably with other terms such as "deployed on" or "located on," herein.

Figure 2:
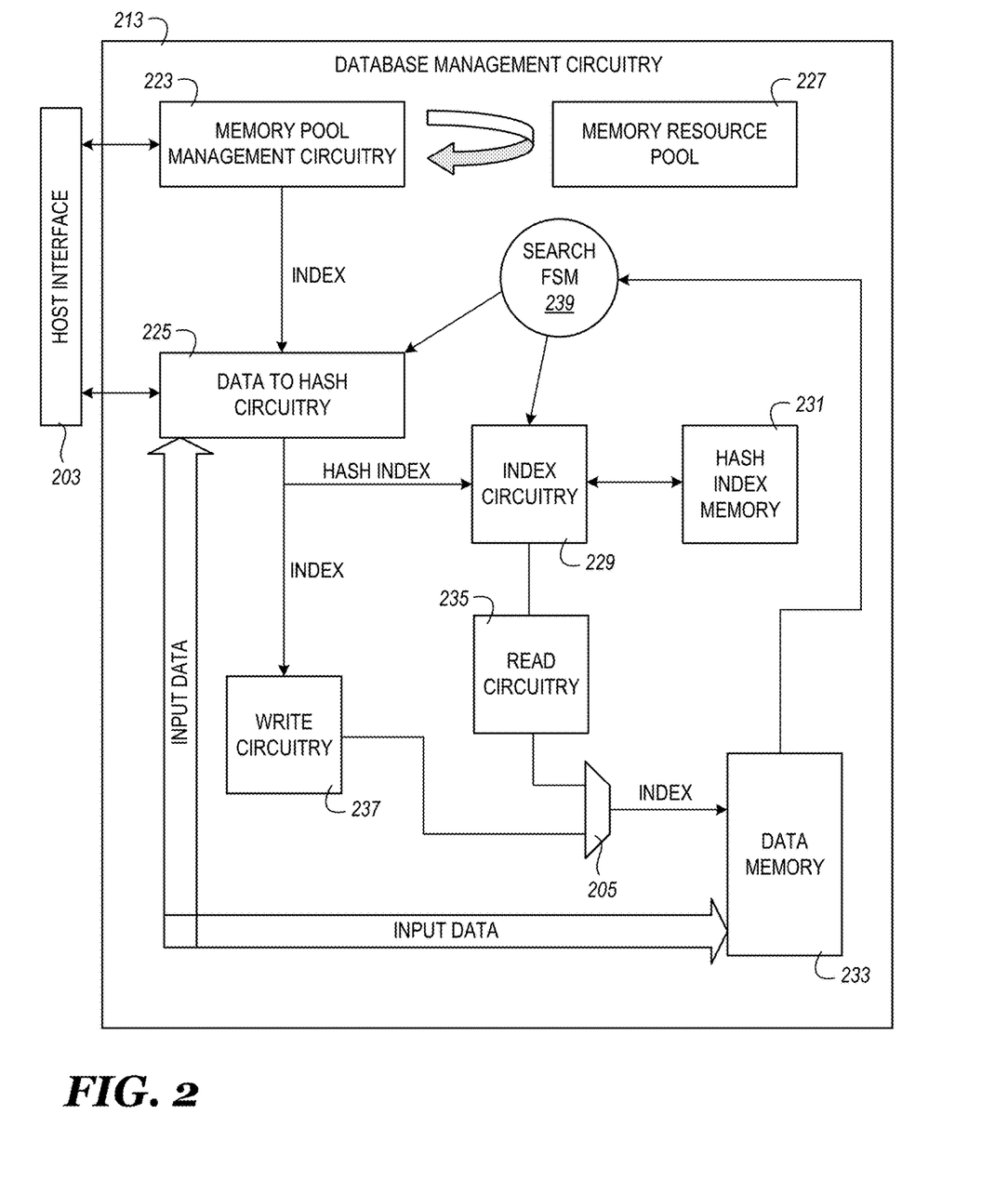
FIG. 2 illustrates an example of database management circuitry in accordance with some embodiments of the present disclosure.

FIG. 2 illustrates an example of database management circuitry 213 in accordance with some embodiments of the present disclosure. The database management circuitry can be analogous to the data management circuitry 113 illustrated in FIG. 1, or at least a portion of the data management circuitry 213 can be contained within the database management circuitry 113 of FIG. 1. In some embodiments, the database management circuitry 213 or at least a portion thereof can be a System on Chip (SoC).

As shown in FIG. 2, the database management circuitry 213 includes memory pool management circuitry 223 and data to hash circuitry 225. The memory pool management circuitry 223 and data to hash circuitry 225 are coupled to a host interface 203. The host interface can be an interface associated with a host system, such as the host system 120 illustrated in FIG. 1. The memory resource pool 227 can include indexes corresponding to each data entry (e.g., each bit string) written to the data memory 233. It is noted that the terms "bit string" and "date entry" may be used interchangeably given the context of the disclosure and generally both refer to a sequence of bits that correspond to data. In some embodiments, the memory pool management circuitry 223 can retrieve an index from the memory resource pool 227 and transfer the index to the data to hash circuitry 225. The memory resource pool 227 and the data memory 233 can, in some embodiments, include random access memory (RAM), among other types of memory resources.

In some embodiments, the memory resource pool 227 can store enough indices to associate an index to each bit string (e.g., data entry) associated with the data memory 233. In a non-limiting example, if there are 1,024 bit strings or data entries associated with the data memory 233, the memory resource pool 227 can include 1,024 indices. It will be appreciated, however, that this specific enumerated example of 1,024 bit strings/data entries and 1,024 indices is merely illustrative and is non-limiting. Accordingly, the memory resource pool 227 can store greater than or fewer than 1,024 indices in embodiments in which the data memory 233 includes greater than or fewer than 1,024 bit strings/data entries, provided there is a 1:1 correspondence between indices and bit strings/data entries. In this particular example, the index can include ten (10) bits but can vary based on the number of bit strings/data entries (e.g., the index can include greater than 10 bits or fewer than 10 bits depending on whether there are greater than or fewer than 1,024 bit strings/data entries).

The data to hash circuitry 225 and/or the index circuitry 229 can perform operations to compress bit strings (e.g., bit strings received via the host interface 203) into a hash corresponding to the bit strings. In some embodiments, the hash can have the same or greater width as an associated index (e.g., an associated index retrieved from the memory resource pool 227). In a non-limiting illustrative example, given 1,024 bit strings/data entries, with an index having a width of ten (10) bits, the hash may be eleven (11) bits wide, thereby allowing for 2,048 hash values to be generated.

The hash index memory 231, which can include a RAM in some embodiments, can use the hash as an address and is configured to store both the index and the modifier mentioned above. In such embodiments, the index and modifier (e.g., the width required to host the index and the modifier) can be given by the following equation: Index with Modifier=10+<modifier>bits. Continuing to use the example numbers for the example above, the hash index memory 231 can have 2,048 rows (corresponding to the 2,048 hash values to be generated in this non-limiting example). As mentioned above, in the current non-limiting example, the index is ten (10) bits, and the modifier can be eight (8) bits, and the Index with Modifier is therefore eighteen (18) bits. Accordingly, the dimensions (rows by columns) of the hash index memory 231 can be 2,048×18.

In some embodiments, the data memory 233 stores the actual data (e.g., the bit strings and/or data entries). That is, the bit strings and/or data entries are written to the data memory 233 and the index and modifier are stored in an address corresponding to associated hashes in the hash index memory 231. In general, the bit strings and/or data entries will be wider (e.g., include more bits) than the index and modifier. Accordingly, continuing with the example numbers used in the foregoing non-limiting example, and assuming two hundred fifty-six bit (256) bit strings/data entries, the data memory may have dimension of 1,024×256. Similar to the memory resource pool 227 and the index memory 231, the data memory 233 can be a RAM or other suitable memory device.

In some embodiments, during operation the database management circuitry 213 can receive a bit string via the host interface 203. As mentioned above, the bit string can be transferred to the database management circuitry 213 via the host interface 203 from a host system, such as the host system 120 illustrated in FIG. 1. The memory pool management circuitry 223 retrieves an index from the memory resource pool 227 and transfers the index to the data to hash circuitry 225.

As mentioned above, the data to hash circuitry 225 generates a hash corresponding to the bit string. The data to hash circuitry 225 may then transfer the index and the modifier via the index circuitry 229 to the hash index memory 231. In some embodiments, the hash is used as an address in the hash index memory 231 and the index and the modifier are stored in the address indicated by the hash in the hash index memory 231. Concurrently or subsequently, the bit string is written to the data memory 233 via the write circuitry 237 and is stored by the data memory 233 as a data entry. In such embodiments, the data entry can be stored in the data memory 233 in an address location that corresponds to the index. In such embodiments, the index can have a width of ten bits, as mentioned above, although embodiments are not so limited.

When a data entry that is written to the data memory 233 is requested, the search finite state machine (FSM) 239 communicates with the data to hash circuitry 225, the index circuitry 229, and the data memory 233 to facilitate retrieval of the requested bit string, as described in more detail below.

As briefly mentioned above, the hash index memory 231 stores a data structure that is maintained as a sparsely populated data structure or table. For example, because the hash index memory 231 can include 2,048 addressable rows and there may be 1,024 bit strings with corresponding indices and modifiers (in the enumerated example given above), the data structure can be maintained as a sparsely populated data structure or table. That is, in the illustrative example above, the 2,048×18 data structure stored by the hash index memory 231 is only fifty percent (50%) populated when the 1,024×256 data memory 233 is fully populated (e.g., is full). This can allow for collisions to be reduced dramatically in comparison to approaches that do not utilize a sparsely populated data structure or table.

For example, for completely random hashes, the first hash would have a zero percent probability of incurring a collision because the data structure is empty. The second hash would therefore have a 1 in 2,048 probability of colliding with the first hash, the third hash would have a 2 in 2,048 probability of colliding with the first hash or the second hash, etc. The last hash (e.g., the 1,024th hash) would have a 1 in 2 probability of colliding with any of the previously written 1,023 hashes.

However, if, for example, 1,024th hash collided and takes a second attempt, the collision probability would be ~¼, the third attempt ~⅛, etc. Continuing with this example, 32 attempts provide a collision probability of $~2^{-32}$ which is $~4e^{-9}$, while 255 attempts result in $~2e^{-77}$. It is noted that the maximum number of attempts described here translates into the probability of an unsuccessful allocation. Accordingly, for most practical uses, allowing tens or low hundreds of attempts brings probability of unsuccessful allocation essentially to zero. In some embodiments, the modifier, which is explained in further detail in connection with FIG. 3, herein corresponds to the number of allocation attempts. Accordingly, for the illustrative example given above, an 8-bit modifier (e.g., corresponding to 255 maximum attempts) can practically eliminate the probability of the failed allocation. Further, when a data entry is requested for retrieval, the modifier can serve to prevent false duplicate data pattern checks, as described in more detail below.

In a non-limiting example, an apparatus (e.g., the database management circuitry 213) includes a first memory resource (e.g., the hash index memory 231) that stores a data structure (e.g., the data structure 332 illustrated in FIG. 3) and a second memory resource (e.g., the data memory 233) that stores a plurality of data entries. As discussed above, the data structure can contain a greater quantity of address locations than a quantity of bit strings to be written to the second memory resource. A processing device (e.g., the memory pool management circuitry 223, the data to hash circuitry 225, the index circuitry 229, the read circuitry 235, and/or the write circuitry 237) is coupled to the first memory resource and the second memory resource. The processing device can retrieve a bit string, for example, via the host interface 203 and generate a hash corresponding to the bit string. As described in more detail in connection with FIG. 3, the hash corresponds to a first address location in the data structure.

The processing device can read a modifier (e.g., one of the modifiers 336 illustrated in FIG. 3) written to a first address location (e.g., one of the rows 335 illustrated in FIG. 3) in the data structure. In some embodiments, the modifier corresponds to a quantity of times that the first address location in the data structure corresponding to the hash has been accessed in performance of an operation to write index information corresponding to the bit string to the first address location. In response to determining that the modifier written to the first address location in the data structure has a first value associated therewith, the processing device can write the index information corresponding to the bit string to the address location in the data structure. In contrast, in response to determining that the modifier has a second value other than the first value associated therewith, the processing device can write the index information corresponding to the bit string to a second address location in the data structure.

Figure 3:
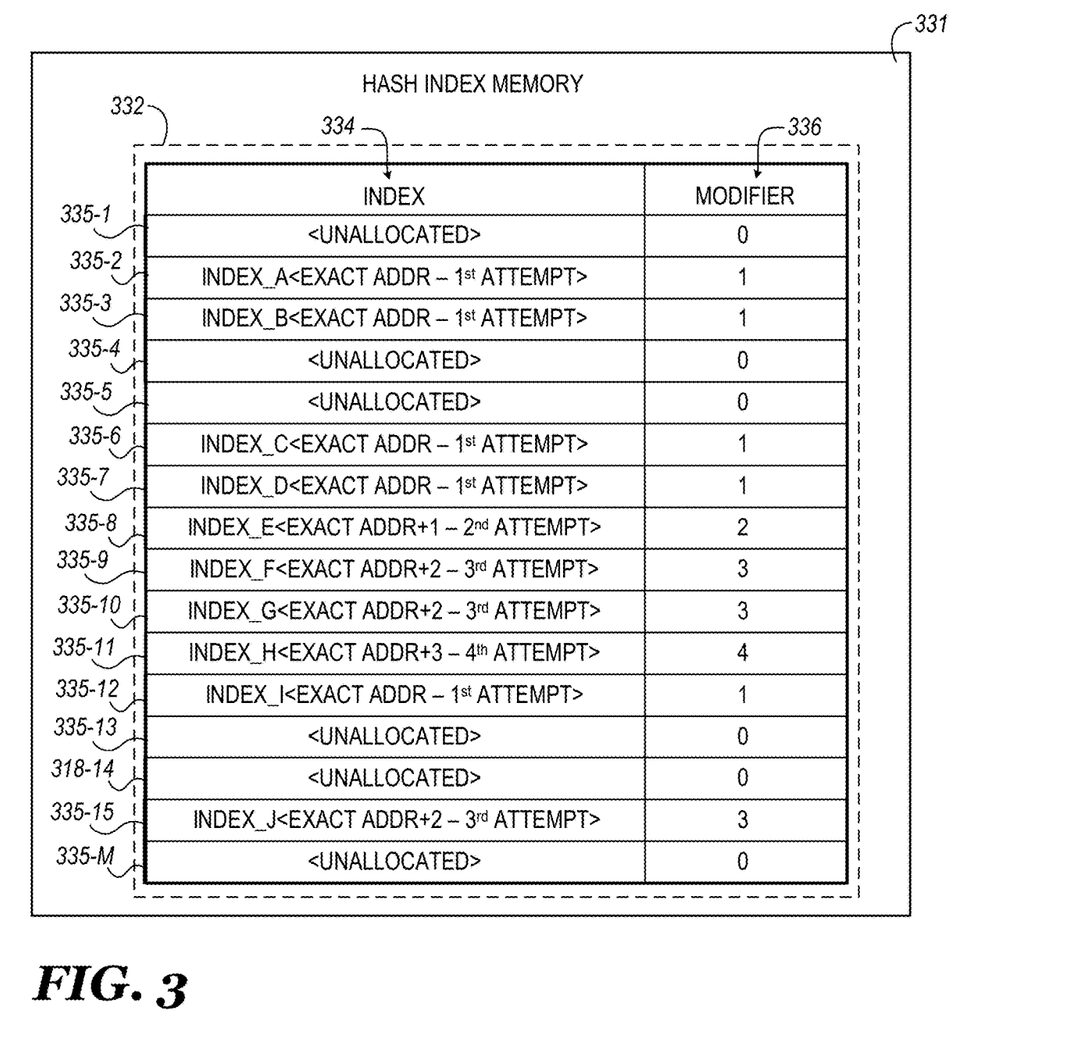
FIG. 3 illustrates an example of a hash index memory including example indices and modifiers in accordance with some embodiments of the present disclosure.

Continuing with this example, in some embodiments the processing device can, in response to determining that the modifier written to the first address location in the data structure has a value of zero associated therewith, increment the modifier written to the first address location in the data structure to a new numerical value (e.g., from a value of "0" to "1"). Similarly, in some embodiments, the processing device can, in response to determining that the modifier written to the first address location in the data structure has a non-zero value associated therewith, increment the modifier written to the first address location in the data structure to a new numerical value (e.g., from a value of "1" to a value of "2," from a value of "2" to a value of "3," etc.).

Continuing with this non-limiting example, the processing device can retrieve a second bit string and generate a hash corresponding to the second bit string. The hash can correspond to a second address location in the data structure. The processing device can read a modifier written to a second address location in the data structure. In some embodiments, the modifier corresponds to a quantity of times that the second address location in the data structure corresponding to the hash has been accessed in performance of an operation to write index information corresponding to the second bit string to the second address location.

In response to determining that the modifier written to the second address location in the data structure has a first value associated therewith, the processing device can write the index information corresponding to the second bit string to the second address location in the data structure. For example, if the first value of the modifier written to the second address location is "0," the index information corresponding to the second bit string can be written to the second address location in the data structure and the modifier can be updated to a value of "1." In contrast, in response to determining that the modifier has a second value other than the first value associated therewith, the processing device can write the index information corresponding to the second bit string to a third address location in the data structure, provided the modifier in the third address location in the data structure have a value of "0." If the modifier in the third address location does not have the value of "0," the process is repeated (as described below in connection with FIG. 3) until a modifier written to a particular address location has the value of "0," at which point the index information is written to that address location.

In some embodiments, the processing device can, in response to determining that the modifier written to the second address location in the data structure has the first value associated therewith, increment the modifier written to the second address location in the data structure to a new numerical value (e.g., from a value of "0" to "1"). Similarly, the processing device can, in response to determining that the modifier written to the second address location in the data structure has the second value associated therewith, increment the modifier written to the second address location in the data structure to a new numerical value (e.g., from a value of "1" to a value of "2," from a value of "2" to a value of "3," etc.).

FIG. 3 illustrates an example of a hash index memory 331 including example indices and modifiers in accordance with some embodiments of the present disclosure. The hash index memory 331 can be analogous to the hash index memory 231 illustrated in FIG. 2. As shown in FIG. 2, the hash index memory 331 includes a data structure 332 that is used to store the hashes, the indices, and/or the modifiers described above. The rows 335-1, 335-2, 335-3, 335-4, 335-5, 335-6, 335-7, 335-8, 335-9, 335-10, 335-11, 335-12, 335-13, 335-14, 335-15, to 335-M (referred to herein as the rows 335-1 to 335-M or, more generally as the rows 335), which correspond to address locations in the hash index memory 331, are each configured to store an index 334 and a modifier 336.

In the illustrative example shown in FIG. 3, each of the rows 335 is either <UNALLOCATED>, which refers to a condition in which an index 334 corresponding to a bit string/data entry (e.g., a bit string/data entry written to the data memory 233) is not written to that particular row, or occupied, as indicated by the rows 335 that include an INDEX (e.g., "INDEX_A," "INDEX_B," etc.). For purposes of illustration, the index 334 shown in FIG. 3 includes information that is used to determine the modifier 336. For example, the address location corresponding to the row 335-1 is <UNALLOCATED>, so the modifier 336 has a value of "0." The address location corresponding to the row 335-2 indicates that an INDEX_A was written to the address location corresponding to the row 335-2 on the first attempt (e.g., prior to writing the bit string having the INDEX_A, the address location corresponding to the row 335-2 was <UNALLOCATED>), and therefore the modifier 336 has a value of "1," indicating that the index 334 was written on the first attempt without incrementing the address location in the data structure 332. The address location corresponding to the row 335-8 indicates that an INDEX E was written to the address location corresponding to the row 335-8 on the second attempt, and the modifier 336 therefore has a value of "2," indicating that the index 334 was written on the second attempt after incrementing the address location in the data structure 332 once.

In order to further clarify embodiments of the present disclosure, several non-limiting examples of how the hash index memory 331 is populated are given below. Examples of allocation procedures, search procedures, removal procedures, and update procedures are each given below. It will be appreciated that these examples are illustrative and are therefore not intended to limit the scope of the disclosure. At the outset, however, it is worth clarifying that the address locations corresponding to the rows 335 of the data structure 332 correspond to an address given by the hash of the bit string, which is calculated data to hash circuitry 225 and/or the index circuitry 229, as described above in connection with FIG. 2. Accordingly, the "EXACT ADDR" (e.g., the "exact address" in which an expected allocation would occur in the absence of a collision) shown in FIG. 3 is the address in the hash index memory 331 corresponding to a hash that does not experience a collision when written to the data structure 332. When such a collision occurs, the address is incremented from the "EXACT ADDR" to a next address location (e.g., a new row 335) and the modifier 336 corresponding to the address location that experienced the collision is incremented. This procedure is performed until an address location that is unallocated is found, at which point the index 334 is written in the unallocated address and the corresponding modifier is incremented to a value of "N," where N corresponds to a number of times the address location is incremented prior to finding the unallocated address location.

Allocation Procedures

An example of a series of procedures that may be performed according to the present disclosure to allocate the address locations of the data structure 332 follow. In some embodiments, this series of procedures may be performed in response to receipt of a command by the database management circuitry 213 to write a bit string to the data memory 233.

For example, when the database management circuitry 213 receives a command to write a bit string to the data memory 233, an index that has not been used (e.g., has not been associated to a bit string and has not been written to the data structure 332) is retrieved from the memory resource pool 227. A bit string (e.g., "input data") is written to the data memory 233 at an address that is associated with the index retrieved from the memory resource pool 227.

A hash corresponding to the bit string can be calculated by the data to hash circuitry 225. As described above, the calculating the hash serves to compress data associated with the bit string such that a fewer quantity of bits are associated with the hash than with the original bit string. Next, an address location (e.g., the exact address) in the data structure 332 that corresponds to the hash is read to determine if the address location is unallocated or allocated. If the address location (e.g., the exact address) that corresponds to the hash is unallocated (e.g., the modifier in the row 335 corresponding to the address location is "0"), the index is written to that particular row along with an updated modifier having a value of "1."

If the address location is allocated (e.g., if an index and modifier that is non-zero is written to the address location, e.g., the exact address), a next address location in the data structure 332 is read. For example, if the exact address corresponds to row 335-3, which is allocated, a next row 335-4 is read to determine if the next row (e.g., the row 335-4) is unallocated or not. In the example shown in FIG. 3, the row 335-4 is unallocated, so the index may be written to that particular row (e.g., row 335-4) along with an updated modifier having a value of "2."

If this next address location (e.g., if the address location corresponding to row 335-4) was allocated, a further next address location in the data structure (e.g., the address location corresponding to the roe 335-5) would be read and so on and so forth until an unallocated address location in the data structure 332 is found. Each time an address location that is allocated is read, the modifier 336 is incremented to track the quantity of attempts at writing the index to that particular address location have been made. The modifier 336 is incremented as <the number of address increments>+1, as shown in FIG. 3. As mentioned above, the number of address increments correspond to a number of times the address has been incremented from the exact address to find an unallocated address location in the data structure 332.

In general, the modifier 336 corresponds to the number of address increments from the first allocation attempt (e.g., the first attempt at the exact address, or "address=hash_address") while moving through the data structure 332 attempting to find an unallocated address location. If the modifier=0, the address location is unallocated. If the modifier=1, the exact address is allocated for the index (e.g., "address=hash"). If the modifier=2, the allocation (writing the index) occurs in an address location that corresponds to the next checked address location subsequent to the exact address (e.g., "address=hash_address+1"), and so on and so forth. Every time a successful allocation occurs (e.g., the index is written to an unallocated address location in the data structure 332), the modifier 336 is checked in comparison to the peak (e.g., highest or largest) value among the previously used modifiers. This "peak value" among the modifiers can be referred to herein as a "peak modifier value" or the "peak modifier" for brevity. If the current modifier 336 exceeds the previous peak value among the previously used modifiers 336, the value of the modifier 336 is incremented, as shown in FIG. 3. It is worth noting that the values of the modifier 336 may become random over time (e.g., they may not sequentially increase as the address location increases) due to the random nature of the hash generation and/or due to updates and/or removals of data entries from the data structure 332 over time.

Search Procedures

An example of a series of procedures that may be performed according to the present disclosure to search the address locations of the data structure 332 follow. In some embodiments, this series of procedures may be performed in response to receipt of a command by the database management circuitry 213 to retrieve a bit string from the data memory 233.

A hash corresponding to the bit string to be retrieved can be calculated by the data to hash circuitry 225. As described above, the calculating the hash serves to compress data associated with the bit string such that a fewer quantity of bits are associated with the hash than with the original bit string. Next, an address location (e.g., the exact address) in the data structure 332 that corresponds to the hash is read to determine the value of the modifier 336 written to that address location. If the address location (e.g., the exact address where "address=hash_address") that corresponds to the hash contains a modifier 336 having a value of "0," it is determined that the address location is unallocated and therefore does not correspond to the bit string that is being searched.

In this scenario, the address in the data structure 332 to be searched is incremented (and/or the expected modifier is incremented) and the contents (particularly, the modifier 336) of a next address location (e.g., "address=hash_address+1") in the data structure 332 are read. Operations to increment the address in the data structure 332 to be searched can be performed until the expected modifier is equal to the peak modifier value discussed above, or until the expected modifier matches the modifier 336 read from the current address location. This match can occur at any stage of the search procedure. For example, a first attempt to search the data structure 332 (where the expected modifier=1) can result in reading a modifier with a value of "1," which indicates that the expected address is, in fact, the first address location read during performance of the search procedure.

Once the expected modifier matches a modifier 336 read from the data structure 332, the location of the bit string/data entry in the data memory 233 is determined and the bit string/data entry can be read from the data memory 233. For example, in this scenario, once the expected modifier matches a modifier 336 read from the data structure 332, in some embodiments, the index 334 written to the data structure 332 can be used as an address in the data memory 233 to locate the searched bit string/data entry in the data memory 233. The bit string/data entry written to the data memory 233 can then be compared to the corresponding data that is searched (e.g., the original data from which the hash was made above) to determine if the search is successful. If the search is determined to be successful, the bit string/data entry can be retrieved as described in connection with FIG. 2, herein.

For example, the data fetched from the data memory 233 can be compared to the data searched (e.g., the data from which the hash was generated) because, in some embodiments, the searching operations described herein are not performed solely for the purpose of confirming that the data is stored or otherwise listed in the data memory 233. In contrast, the bit string/data entry can be an entry with a particular structure (e.g., a particular layout and/or quantity of portions that correspond to fields within the bit string/data entry). For example, the search operation may be performed to search for virtual address to determine a corresponding physical address. In such embodiments, the searching operation can therefore be performed to search a particular field within the bit string/data entry to determine one or more other corresponding fields associated with the bit string/data entry.

If, however, it is determined that the comparison between the bit string/data entry written to the data memory 233 and the corresponding searched data (e.g., the data requested) does not match, the search operations described above can continue in an effort to locate the correct bit string/data entry. Further, if the expected modifier fails to match the modifier 336 once the peak modifier value is reached, the database management circuitry 213 can terminate the search and return an indication that the data entry was not found.

It is noted that the data memory 233 is not read until such a match between the expected modifier and the read modifier 336 in the data structure 332 occurs. This serves to reduce power consumption of the database management circuitry 213 by reducing a number of read attempts that may not return the correct bit string/data entry.

Removal Procedures

An example of a series of procedures that may be performed according to the present disclosure to remove (e.g., remove/delete indices 334 and/or data associated therewith from the address locations 335 of the data structure 332) follow. In some embodiments, this series of procedures may be performed subsequent to retrieval of a bit string from the data memory 233, as discussed above.

Once a bit string/data entry is successfully located and retrieved (e.g., written to the host system 120 from the data memory 233, etc.), the index information corresponding to the bit string/data entry can be removed (e.g., deleted) from the data structure 332. The index corresponding to the bit string/data entry can be then returned to the memory resource pool 227. Subsequent to, or concurrently with, removing the index information corresponding to the bit string/data entry from the data structure 332, the modifier 336 corresponding the address location (e.g., the row 335) that stored the index information corresponding to the bit string/data entry can be updated to have a value of "0," thereby indicating that the address location is now unallocated.

In some embodiments, the bit string/data entry written to the data memory 233 that is retrieved as a result of the searching procedures discussed above may not be removed or deleted from the data memory 233 when the index information corresponding to the bit string/data entry is removed (e.g., deleted) from the data structure 332.

Update Procedures

An example of a series of procedures that may be performed according to the present disclosure to update (e.g., remove indices 334 and/or data associated therewith from the address locations 335 of the data structure 332) follow. In some embodiments, this series of procedures may be performed subsequent to retrieval of a bit string from the data memory 233, as discussed above. The main difference between an update procedure and a removal procedure and/or an allocation procedure (described above) is that the update procedure generally does not involve removal of the index information corresponding to the bit string/data entry from the data structure 332. That is, the removal procedure generally does not require that the index information corresponding to the bit string/data entry in the data structure 332 is removed from the data structure 332 and returned to the memory resource pool 227.

For example, an update procedure can involve reusing a same index 334 either in a same address location or in a different address location in the data structure 332, provided the hash, and therefore the address corresponding to the hash is the same in the former scenario. That is, if a physical address is updated that corresponds to a previous logical address (e.g., the search data that the hash was generated from remains the same, but the bit string/data entry is updated), a same address location can be reused involving the same index. However, the statistical probability of this scenario occurring are generally low and, in most embodiments, the index may be reused in a different address location in the data structure 332 in accordance with the update procedures described herein.

The peak modifier described above may be updated during performance of any of the procedures described herein. As mentioned above, it may be determined that the peak modifier value has been reached. In addition to this, a number of occurrences that the peak modifier has been reached can be determined and/or recorded. For example, if a first iteration of an allocation or search procedure involves access of an address location that has a modifier with a value of "2," the peak value occurrence count can be set to a value of "1" (e.g., "modifier_2_count=1"). On a subsequent procedure in which the modifier associated with the address location is determined to have a value of "2," the peak value occurrence count can be incremented to a value of "2" (e.g., "modifier_2_count=2"), and so on and so forth. In this example, when the modifier has the value of "2" and is the modifier having the current highest value, the peak_modifier value can be set at a value of "2."

This can allow for a determination to be made with regards to not only what the values of the modifiers are, but also how many times each modifier has been used and/or detected. In some embodiments, the number of occurrences detected for each modifier can be written to and stored in a table within a data structure, such as the data structure 332, or in any other memory area within the memory sub-system 110. For the non-limiting example described herein, this table may include 255 entries to account for not counting the case when the modifier is equal to "0."

Continuing with this non-limiting example, as bit strings/data entries are updated and/or removed, corresponding modifier counts can be decremented. In some embodiments, if a particular modifier counter is decremented to a value of "0," the next lower modifier value that has a non-zero count associated therewith becomes the new peak_modifier. In an illustrative non-limiting example, if there is one peak modifier that has a value of "6," (e.g., the modifier count=1), there are no modifiers that have a value of "5," (e.g., the modifier count=0) and there are two modifiers that have a value of "4," (e.g., the modifier count=2), during an update procedure, the peak modifier having the value of "6" can be removed (e.g., updated to have a of "0") and a new peak modifier having the value of "4" can be used (as there is no modifier having the value of "5" in this illustrative example). Further, if a particular modifier count has a value of "0," the associated modifier does not exist in the data memory 233 and the associated address location is unallocated.

Stated alternatively, in the foregoing non-limiting example, a count can be maintained for the modifier(s) that runs from a value of "1" to a value of "225." Modifiers that have not yet been used may have a count of "0" associated therewith. The peak modifier can be associated with a modifier that has a highest non-zero count value among one or more of the counters. As discussed above, when a data entry is updated and/or removed, the count for a corresponding modifier is updated (e.g., decremented), which may trigger updating of the peak modifier. In some embodiments, an operation to find a next highest existing modifier value with a non-zero counter can be performed and the peak modifier value can be set to the value of the next existing highest modifier value (e.g., if the next highest modifier has a value of "3," the peak modifier can be updated to have a value of "3."

In a non-limiting example, an apparatus (e.g., the database management circuitry 213 illustrated in FIG. 2) includes a first memory resource (e.g., the data memory 233 illustrated in FIG. 2) that stores a data structure (e.g., the data structure 332) and a data structure 332 stored by a second memory resource (e.g., the hash index memory 231 illustrated in FIG. 2). A processing device (e.g., the memory pool management circuitry 223, the data to hash circuitry 225, the index circuitry 229, the read circuitry 235, and/or the write circuitry 237 illustrated in FIG. 2) is coupled to the first memory resource and the second memory resource. As described above, the data structure 332 may contain a greater quantity of address locations than a quantity of address locations associated with the first memory resource. The processing device can generate a hash associated with a data entry written to the first memory resource. In some embodiments, the hash corresponds to a first address location (e.g., an address associated with one of the rows 335) in the data structure 332. The processing device can then read a modifier 336 written to the first address location in the data structure 332.

The processing device can, in response to a determination that the modifier 336 written to the first address location in the data structure 332 has a first value associated therewith, write an index 334 value associated with the data entry written to the first memory resource to the first address location in the data structure 332. In the alternative, the processing device can, in response to a determination that the modifier has a second value associated therewith, read a modifier 336 written to a second address location in the data structure 332, determine whether the modifier 336 written to the second address location in the data structure 332 has the first value associated therewith, and in response to a determination that the modifier 336 written to the second address location in the data structure 332 has the first value associated therewith, write an index 334 value associated with the data entry written to the first memory resource to the second address location in the data structure 332.

Continuing with this non-limiting example, the processing device can, in response to a determination that the modifier 336 written to the second address location in the data structure 332 has the second value associated therewith, read a modifier 336 written to a third address location in the data structure 332, determine whether the modifier 336 written to the third address location in the data structure 336 has the first value associated therewith, and in response to a determination that the modifier 336 written to the third address location in the data structure 332 has the first value associated therewith, write an index 334 value associated with the data entry written to the first memory resource to the third address location in the data structure 336. As described above, in some embodiments, the first value associated with the modifier 336 is a value of zero or a value of one and the second value associated with the modifier is a value greater than zero or greater than one.

In some embodiments, the processing device can retrieve the data entry from the first memory resource and, subsequent to retrieval of the data entry from the first memory resource, remove data associated with the data entry from the data structure 332, as described above in connection with the removal procedures. In some embodiments, the processing device can retrieve the data entry from the first memory resource and, subsequent to retrieval of the data entry from the first memory resource, reset the modifier 336 associated with an address location in the data structure 332 that corresponded to the data entry to a value of zero, as described above in connection with the removal procedures.

Figure 4:
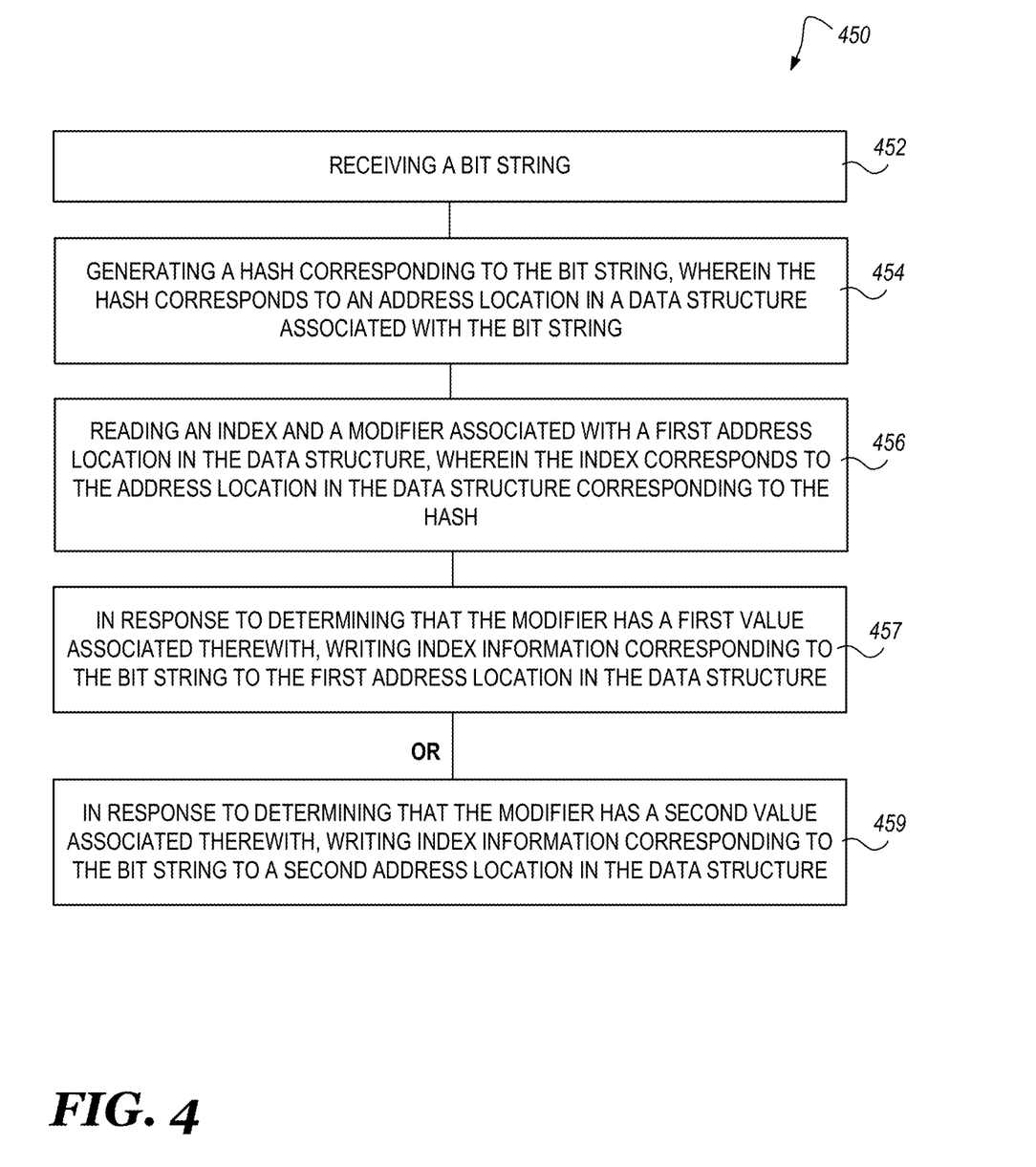
FIG. 4 is a flow diagram corresponding to a method for database management in accordance with some embodiments of the present disclosure.

FIG. 4 is a flow diagram corresponding to a method 450 for database management in accordance with some embodiments of the present disclosure. The method 450 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 450 is performed by the database management circuitry 113 of FIG. 1 and/or the database management circuitry 213 of FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 452, the method 450 includes receiving a bit string. The bit string can be received via the host interface 203 shown in FIG. 2. The bit string can include a quantity of logical bits that correspond to data that is to be written to a data memory, such as the data memory 233 illustrated in FIG. 2.

At operation 454, the method 450 includes generating a hash corresponding to the bit string. In some embodiments, the hash corresponds to an address location (e.g., an address location indicated by the rows 335 of FIG. 3) in a data structure (e.g., the data structure 332 illustrated in FIG. 3, herein) associated with the bit string. The hash can be generated by the data to hash circuitry 225 of FIG. 2, as described above. As discussed above, the data structure can contain a greater quantity of address locations than a quantity of bit strings to be written to a data memory in order to maintain the data structure as a sparsely populated data structure.

At operation 456, the method 450 includes reading an index (e.g., the indices 334 of FIG. 3) and a modifier (e.g., the modifier(s) 336 of FIG. 3) associated with a first address location in the data structure. The index can correspond to the address location in the data structure corresponding to the hash, as described above. For example, the index can be previously retrieved from the memory resource pool 227 of FIG. 2 and can be associated to the hash determined at operation 454 where the hash is indicative of the address of the data structure in which the index is written and/or stored. As described above, the modifier associated with the first address location in the data structure can correspond to a quantity of attempted accesses involving respective address locations corresponding to hashes that are associated with a plurality of bit strings involving the first address location in the data structure.

At operation 457, the method includes, in response to determining that the modifier has a first value associated therewith (e.g., a value of "0"), writing index information corresponding to the bit string to the first address location in the data structure. In some embodiments, the method 450 includes incrementing the modifier in response to determining that the modifier has the first value associated therewith.

In the alternative, at operation 459, the method 450 includes in response to determining that the modifier has a second value (e.g., a non-zero value) other than the first value associated therewith, writing the index information corresponding to the bit string to a second address location in the data structure. In some embodiments, the method 450 includes incrementing the modifier in response to determining that the modifier has the second value associated therewith.

Whether the index information corresponding to the bit string is written to the first address location, the second address location, or a different address location other than the first address location or the second address location is determined in accordance with the various embodiments described herein in connection with FIG. 2 and FIG. 3.

In some embodiments, the method 450 includes receiving a second bit string and generating a hash corresponding to the second bit string, wherein the hash corresponding to the second bit string corresponds to an address location in the data structure that is associated with the second bit string bit string. The method 450 can further include reading a modifier associated with a second address location in the data structure and in response to determining that the modifier associated with the second address location in the data structure has a value of zero associated therewith, writing index information corresponding to the second bit string to the second address location in the data structure.

In some embodiments, the method 450 can include, in response to determining that the modifier associated with the second address location in the data structure has a non-zero value associated therewith, reading a modifier associated with a third address location in the data structure and writing the index information corresponding to the second bit string to the third address location in the data structure in response to the modifier associated with the third address location in the data structure having a value of zero associated therewith. In response to determining that the modifier associated with the second address location in the data structure has the non-zero value associated therewith, the method 450 can further include incrementing the modifier associated with the second address location in the data structure.

Figure 5:
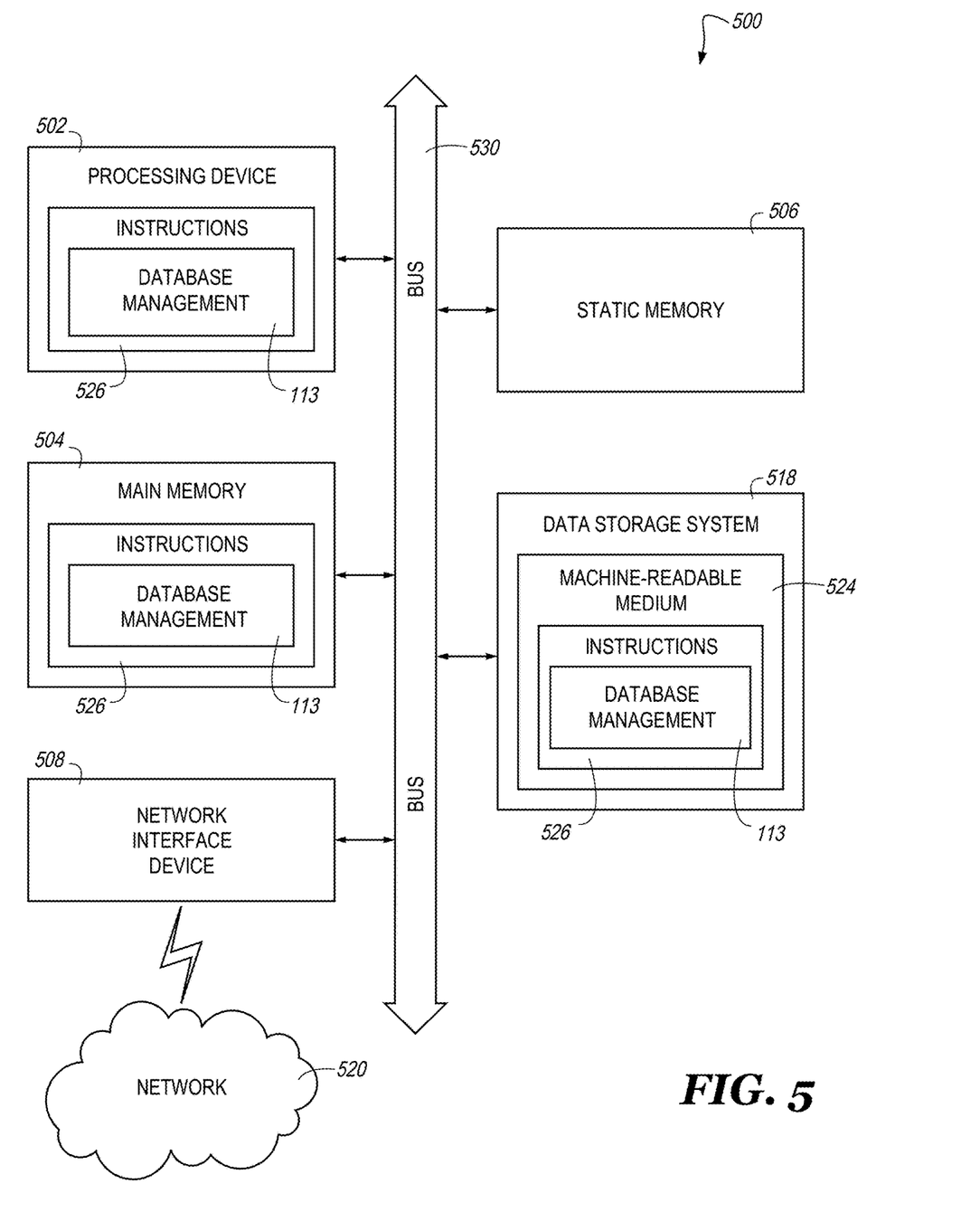
FIG. 5 is a block diagram of an example computer system in which embodiments of the present disclosure may operate.

FIG. 5 is a block diagram of an example computer system in which embodiments of the present disclosure may operate. For example, FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the database management circuitry 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

The processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to database management circuitry (e.g., the database management circuitry 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A computer implemented method, comprising:
retrieve a bit string;
generate a hash corresponding to the bit string, wherein the hash corresponds to an address location in the data structure associated with the bit string;
reading an index and a modifier associated with a first address location in the data structure, wherein the index corresponds to the address location in the data structure corresponding to the hash; and
in response to determining that the modifier has a first value associated therewith, writing index information corresponding to the bit string to the first address location in the data structure, or
in response to determining that the modifier has a second value other than the first value associated therewith, writing the index information corresponding to the bit string to a second address location in the data structure.

2. The computer implemented method of claim 1, wherein the modifier associated with the first address location in the data structure corresponds to a quantity of attempted accesses involving respective address locations identified by hashes corresponding to a plurality of bit strings involving the first address location in the data structure.

3. The computer implemented method of claim 1, further comprising, in response to determining that the modifier has the first value associated therewith, incrementing the modifier.

4. The computer implemented method of claim 1, further comprising, in response to determining that the modifier has the second value associated therewith, incrementing the modifier.

5. The computer implemented method of claim 1, wherein the data structure contains a greater quantity of address locations than a quantity of bit strings to be written to a data memory.

6. The computer implemented method of claim 1, further comprising:
receiving a second bit string;
generating a hash corresponding to the second bit string, wherein the hash corresponding to the second bit string corresponds to an address location in the data structure that is associated with the second bit string;
reading a modifier associated with a second address location in the data structure; and
in response to determining that the modifier associated with the second address location in the data structure has a value of zero associated therewith, writing index information corresponding to the second bit string to the second address location in the data structure, or
in response to determining that the modifier associated with the second address location in the data structure has a non-zero value associated therewith:
reading a modifier associated with a third address location in the data structure; and writing the index information corresponding to the second bit string to the third address location in the data structure in response to the modifier associated with the third address location in the data structure having a value of zero associated therewith.

7. The computer implemented method of claim 6, further comprising, in response to determining that the modifier associated with the second address location in the data structure has the non-zero value associated therewith, incrementing the modifier associated with the second address location in the data structure.

8. An apparatus, comprising:
a first memory resource that stores a data structure;
a second memory resource that stores a plurality of data entries; and
a processing device coupled to the first memory resource and the second memory resource, wherein the processing device is configured to:
retrieve a bit string;
generate a hash corresponding to the bit string, wherein the hash corresponds to a first address location in the data structure;
read a modifier written to a first address location in the data structure, wherein the modifier corresponds to a quantity of times that the first address location in the data structure corresponding to the hash has been accessed in performance of an operation to write index information corresponding to the bit string to the first address location; and
in response to determining that the modifier written to the first address location in the data structure has a first value associated therewith, write the index information corresponding to the bit string to the address location in the data structure, or
in response to determining that the modifier has a second value other than the first value associated therewith, write the index information corresponding to the bit string to a second address location in the data structure.

9. The apparatus of claim 8, wherein the processing device is configured to, in response to determining that the modifier written to the first address location in the data structure has a non-zero value associated therewith, increment the modifier written to the first address location in the data structure to a new numerical value.

10. The apparatus of claim 8, wherein the processing device is configured to, in response to determining that the modifier written to the first address location in the data structure has a value of zero associated therewith, increment the modifier written to the first address location in the data structure to a new numerical value.

11. The apparatus of claim 8, wherein the data structure contains a greater quantity of address locations than a quantity of bit strings to be written to the second memory resource.

12. The apparatus of claim 8, wherein the processing device is configured to:
retrieve a second bit string;
generate a hash corresponding to the second bit string, wherein the hash corresponds to a second address location in the data structure;
read a modifier written to a second address location in the data structure, wherein the modifier corresponds to a quantity of times that the second address location in the data structure corresponding to the hash has been accessed in performance of an operation to write index information corresponding to the second bit string to the second address location; and
in response to determining that the modifier written to the second address location in the data structure has a first value associated therewith, write the index information corresponding to the second bit string to the second address location in the data structure, or
in response to determining that the modifier has a second value other than the first value associated therewith, write the index information corresponding to the second bit string to a third address location in the data structure.

13. The apparatus of claim 12, wherein the processing device is further configured to, in response to determining that the modifier written to the second address location in the data structure has the first value associated therewith, increment the modifier written to the second address location in the data structure to a new numerical value.

14. The apparatus of claim 12, wherein the processing device is further configured to, in response to determining that the modifier written to the second address location in the data structure has the second value associated therewith, increment the modifier written to the second address location in the data structure to a new numerical value.

15. An apparatus, comprising:
a first memory resource;
a data structure stored by a second memory resource; and
a processing device coupled to the first memory resource and the second memory resource, wherein the processing device is configured to:
generate a hash associated with a data entry written to the first memory resource, wherein the hash corresponds to a first address location in the data structure;
read a modifier written to the first address location in the data structure; and
in response to a determination that the modifier written to the first address location in the data structure has a first value associated therewith, write an index value associated with the data entry written to the first memory resource to the first address location in the data structure; or
in response to a determination that the modifier has a second value associated therewith:
read a modifier written to a second address location in the data structure;
determine whether the modifier written to the second address location in the data structure has the first value associated therewith; and
in response to a determination that the modifier written to the second address location in the data structure has the first value associated therewith, write an index value associated with the data entry written to the first memory resource to the second address location in the data structure.

16. The apparatus of claim 15, wherein the processing device is configured to, in response to a determination that the modifier written to the second address location in the data structure has the second value associated therewith:
read a modifier written to a third address location in the data structure;
determine whether the modifier written to the third address location in the data structure has the first value associated therewith; and
in response to a determination that the modifier written to the third address location in the data structure has the first value associated therewith, write an index value associated with the data entry written to the first memory resource to the third address location in the data structure.

17. The apparatus of claim 15, wherein the processing device is configured to:
retrieve the data entry from the first memory resource; and
subsequent to retrieval of the data entry from the first memory resource, remove data associated with the data entry from the data structure.

18. The apparatus of claim 15, wherein the processing device is configured to:
retrieve the data entry from the first memory resource; and
subsequent to retrieval of the data entry from the first memory resource, reset the modifier associated with an address location in the data structure that corresponded to the data entry to a value of zero.

19. The apparatus of claim 15, wherein:
the first value associated with the modifier is a value of zero or a value of one, and
the second value associated with the modifier is a value greater than zero or greater than one.

20. The apparatus of claim 15, wherein the data structure contains a greater quantity of address locations than a quantity of address locations associated with the first memory resource.

* * * * *